United States Patent [19]

Fiscella

[11] 4,391,834
[45] Jul. 5, 1983

[54] METHOD OF EXTENDING AND FLAVORING ICE MILK OR CREAM

[75] Inventor: James T. Fiscella, Ottumwa, Iowa

[73] Assignee: TJT Food Flavoring, Inc., Ottumwa, Iowa

[21] Appl. No.: 355,166

[22] Filed: Mar. 5, 1982

Related U.S. Application Data

[63] Continuation-in-part of Ser. No. 132,872, Mar. 24, 1980, abandoned.

[51] Int. Cl.³ .............................................. A23G 9/021
[52] U.S. Cl. ..................................... 426/565; 426/566; 426/567; 426/576; 426/654
[58] Field of Search ............... 426/565, 566, 567, 576, 426/654

[56] References Cited

U.S. PATENT DOCUMENTS

| 183,862 | 10/1876 | Morfit | 426/576 |
|---|---|---|---|
| 1,388,084 | 8/1921 | Albert | 426/576 |
| 2,130,654 | 9/1938 | Sadler | 426/576 |
| 2,253,614 | 8/1941 | Epstein et al. | 426/57 |
| 2,558,453 | 6/1951 | Minster | 426/565 |
| 3,003,882 | 10/1961 | Peat | 426/565 |
| 3,471,301 | 10/1969 | Mitchell | 426/565 |
| 3,702,768 | 11/1972 | Finucane | 426/566 |
| 3,792,182 | 2/1974 | Carpigiani | 426/565 |
| 3,930,052 | 12/1975 | De Brou | 426/565 |
| 4,297,379 | 10/1981 | Topalian | 426/565 |
| 4,346,120 | 8/1982 | Morley | 426/565 |

OTHER PUBLICATIONS

Knox Gelatine, Knox Gelatine Co., Inc., Johnstown, New York, 1927.
Arbuckle, W. S., 3rd ed., Ice Cream AVI Publishing Co., Westport, Conn., 1977 pp. 210.

Primary Examiner—Jeanette M. Hunter
Attorney, Agent, or Firm—Zarley, McKee, Thomte, Voorhees & Sease

[57] ABSTRACT

A method of extending and flavoring a soft serve product includes the steps of preparing a gelatin extender by adding a gelatin mix including approximately 18 grams of gelatin to one gallon of cold tap water, stirring and then adding the gelatin extender to a commercially prepared liquid soft serve product in quantities approximately proportional to one gallon of gelatin extender to between three and four gallons of the liquid soft serve product.

Powdered ice cream mixes may also be extended by adding the gelatin extender of the invention to the liquid ice cream in quantities approximately proportional to one gallon of gelatin extender to between three and four gallons of liquid ice cream produced from the powdered product.

11 Claims, No Drawings

METHOD OF EXTENDING AND FLAVORING ICE MILK OR CREAM

CROSS REFERENCE TO RELATED APPLICATION

This application is a continuation-in-part of U.S. patent application Ser. No. 132,872 which was filed on Mar. 24, 1980 now abandoned.

BACKGROUND OF THE INVENTION

This invention is directed to a method of extending and flavoring ice milk or ice cream which may take the form of either a soft serve product or a homemade ice cream mix.

The commercial production of ice cream typically involves an investment of $150,000 or more in machinery for making the ice cream. Using this machinery, the production of ice cream typically involves a three to four hour operation including various heating, cooling and mechanical mixing and handling steps. Thus, the energy, labor and machinery expenses of producing ice cream result in a relatively expensive product. The present invention is directed to two particular forms of such products, namely soft serve products and powdered mixes.

Certain terms of art will be defined for facilitating the description of the present invention. Generally, "ice cream" is regarded to be that which includes between 5% and 12% butterfat with 8% being about average. Products having less than 5% butterfat are referred to as "ice milk." "Non-dairy ice creams" have no butterfat. "Soft serve products" may be either ice cream, ice milk or a non-dairy ice cream. All are prepared to meet industry standards for resisting beating and flaking and are generally provided in liquid form. Powdered mixes are marketed for commercial ice cream preparation.

Soft serve products are very popular. The commercially prepared soft serve products are expensive however. Accordingly, there is a need for making the soft serve products less expensive while retaining the smooth, non-grainy qualities.

The omission of butterfat or lower percentages thereof generally result in a grainier, less smooth product which also requires lower temperatures to maintain it in a stable condition. It is also generally true that the greater the amount of butterfat and/or solids, the more expensive is the product.

Thus the objective of this invention is to provide a method for extending soft serve products and powdered ice cream mixes to produce a product having all of the characteristics of a high in butterfat content ice cream without using butterfat or any equivalent expensive ingredients.

Another object is to provide a method for extending soft serve products and powdered ice cream mixes which can be performed independently of the expensive machinery typically required for ice cream production.

Accordingly, an object of the invention is to provide a method for extending a soft serve product and/or powdered ice cream mix 20% to 35% with only a minimal added investment.

A related object is to provide a method for extending soft serve products and/or powdered ice cream mixes which can be easily performed in a minimum amount of time.

It has previously been known to use gelatin as an ingredient in various frozen desserts. For example, the 1921 U.S. Pat. No. 1,388,084 discloses a powder compound containing gelatin for use in milk shakes. In other frozen desserts such as that disclosed in the 1938 U.S. Pat. No. 2,253,614, the gelatin must be heated when mixed with the base liquid. Finally, others have proposed whipped desserts wherein air is beat into the product to increase its volume. Gelatin may be included in such desserts as in U.S. Pat. No. 2,130,654 but its function therein is not understood.

The prior art has thus used gelatin in the production of frozen desserts which are something other than ice cream or soft serve products. The present invention does not teach a method of making ice cream or a soft serve product but rather a method of extending an existing ice cream or soft serve product. In any event, it has not heretofore been known or thought possible to add a gelatin mix and water to a soft serve product and produce a product which has the same flavor quality and consistency as the commercially prepared soft serve products.

Besides the expense of commercially prepared soft serve products and powdered ice cream mixes, another problem is that such products are generally available only in chocolate and vanilla flavors. Other flavors are generally produced by adding extracts and expensive fruit pulps to a vanilla flavored soft serve product, thereby adding to the expense of the product with little or no increase in volume.

Accordingly, a further object of the invention is to provide a method for flavoring soft serve products and powdered ice cream mixes while, at the same time, reducing the cost per volume of the flavored end product.

SUMMARY OF THE INVENTION

It has been found that the addition of gelatin premixed in water to a liquid soft serve product results in an extended and bonded product which has all of the characteristics of the high butterfat ice creams but without the cost. A mix of gelatin, which is relatively inexpensive, and sugar is provided having a consistency similar to that of granulated sugar. This mix is stirred into water which in turn is mixed into the conventional liquid soft serve product mix. While it would be expected that the resulting extended product would be thinner, more grainy and less tasteful, just the opposite is true. Additionally, gelatin mixes including any desired flavor can be mixed into the water to impart the desired flavor to the resulting extended soft serve product at a cost still significantly less than the non-flavored conventional liquid soft serve product.

The extended soft serve product uses all of the investment and know-how that went into the conventional soft serve product and extends it through a higher volume product which meets all of the same industry standards. The gelatin extender may be quickly and easily added to the conventional soft serve product with no additional heating or grinding steps being required. The resulting product may be stored in conventional soft serve dispensing machines at a temperature of between 22° F. and 24° F.

The gelatin tends to bond all of the ingredients together even though the solids content of the extended product is less than that of the original product. Under conditions of continuous mixing in a soft serve product dispensing machine, the butterfat tends to break off. The gelatin acts as a stabilizer for the butterfat however, thereby creating an artificial solids effect. Gelatin also enhances the flavor of the product and counteracts the normal adverse affects to flavor caused by changes in temperature and by the mechanical action on the product which occurs in soft serve mixing and dispensing machines. Products maintained at low temperatures sometimes do not appear to have the same flavor as the same products at higher temperatures but with the inclusion of gelatin, the quality is as apparent at low temperatures as at higher temperatures.

DESCRIPTION OF THE PREFERRED EMBODIMENTS

Generally, the procedure for producing the extended soft serve product of this invention involves first taking gelatin in the form of a commercially available gelatin mix such as that marketed under the trademark JELL-O sold by General Foods Corporation and adding that to cold tap water to produce a gelatin extender. This extender is then immediately mixed with a conventional liquid soft serve product which can then be used, stored or dispensed.

Specifically, in the preferred embodiment of the invention, the gelatin mix will be in the amount of six ounces, of which approximately 18 grams is gelatin. The remaining non-gelatin portion of the mix is substantially sugar. A six ounce box of JELL-O may be used of any desired flavor. This six ounce gelatin mix is stirred into one gallon of cold tap water having a temperature of less than approximately 100° F. to produce the gelatin extender. Note that no grinding or pulverizing is necessary. The extender is immediately added to three or four gallons of a conventional liquid soft serve product to produce the extended and flavored soft serve prodouct.

In the case of dairy-type ice cream or ice milk, four gallons will be used to produce a total of five gallons while non-dairy ice cream products in the amount of three gallons will be used to produce a total of four gallons of extended and flavored soft serve product.

A non-dairy soft serve product can be obtained from Grain Processors, Inc., Muscatine, Iowa, Frostline Division, and is referred to as D-400. Additionally, the ingredients for the D-400 are sugar, corn syrup, solids, partially hydrogenated vegetable oil (coconut), cellulose gum, sodium caseinate, salt, artificial and natural flavors, mono and diglycerides, artifical color.

While the solids content of the soft serve product will be reduced from between approximately 25% and 30% to between approximately 18% and 25% when the extender and binder are added, it will nevertheless not be noticeable in the appearance, taste and consistency of the resulting extended soft serve product whether it be dairy or non-dairy in nature.

The term "solids" is used to refer to anything that does not have liquid content to it and includes such ingredients as sugar, powdered milk, fillers, etc.

As an example, three percent butterfat ice cream contains 25% solids. Thus, four gallons at 140 ounces per gallon for a total of 560 ounces includes 140 ounces of solids or 25%. When the gallon of water and gelatin mix are added, a total of five gallons is produced with an additional eight ounces of solids giving 146 ounces of the total of 700 ounces for a solids content of approximately 21%.

Another typical example would start out with a commercially available soft serve ice milk product having a content of 70% water and 30% solids including butterfat, sugar and gelatin. Upon adding one gallon of water mixed with six ounces of gelatin mix, five gallons of extended soft serve product are produced having a content of 75% water, approximately 24.2% original solids and approximately 0.8 percent gelatin mix. A range of between approximately 0.7 and 0.9 percent gelatin mix in the extended product is acceptable. Percentages outside of this range result in a product which will not freeze with the right consistency for dispensing as a soft serve product.

Another example would be in the case of non-dairy ice cream Frostline D-400 wherein a six pound bag of solids mixed with three gallons of water produce 420 ounces of soft serve product with 96 ounces being solids for 22.8% solids. When these three gallons are added to a gallon of the gelatin extender, the solids content is raised to 102 ounces (96+6) and the total weight is increased to 560 (420+140) giving a solids content of approximately 18%.

Thus it is seen that while most people working with soft serve products would expect to add more solids to improve the quality of the product, using applicant's invention, the quality can be maintained if not improved by using less solids with gelatin being added which functions as a binder and thus in effect creates artificial solids. In the soft serve product business, it is believed that at least 25% solids is required but applicant's product meets industry standards while having a soilds content of only 18% to 20%.

Another important application of the present invention is for extending powdered ice cream products which are marketed for commercial ice cream production in six pound packages for producing three gallons of ice cream product. By mixing one gallon of gelatin extender to those three gallons, four gallons of extended ice cream product are produced having the same quality and consistency as the original product but at a significantly reduced cost per volume. For homemade ice cream 12 ounce packages may be provided which would produce two quarts of the extended ice cream product.

In addition, the present invention enables a variety of flavors to be added which was otherwise conventionally accomplished by the addition of expensive extracts and fruit pulps which increased rather than decreased the cost per volume of the flavored product.

At least ten flavors can be had by choosing the appropriate flavored JELL-O (gelatin) product and these include strawberry, black raspberry, orange-pineapple, lemon, cherry, peach, tutti-frutti, lemon-lime, pistachio and black cherry. The ingredients in a six ounce box of JELL-O are: sugar, gelatin, adipic acid (for tartness), disodium phosphate (controls acidity), fumaric acid (for tartness), artificial color, natural and artificial flavors with BHA (a preservative).

A substantial energy savings is made possible by use of the present invention. First, because the extended product has a lower solids content, it cools faster. Whereas twenty minutes is a typical start-up time for a soft serve product dispensing machine, only about fifteen minutes would be required for the extended product of the present invention. Furthermore, whereas soft serve products are normally maintained between 19° F. and 21° F., the extended product of the invention may be maintained in the same machines at approximately two degrees higher temperature. Thus reductions are achieved both in the energy consumption for running the coolers and the amount of water used for cooling.

Whereas only a limited number of preferred embodiments of the invention are described herein, it will be apparent to those skilled in the art that many modifications, substitutions and alterations may be made which are within the intended broad scope of the appended claims. For example, whereas the gelatin mix is most easily provided as those six ounce packets commercially marketed under the trademarks JELL-O and ROYAL, it will be apparent that such mixes could be formulated as part of the process for preparing the gelatin extender.

Thus there has been shown and described a method of extending and flavoring a soft serve product and powdered ice cream mix which accomplishes at least all of the stated objects.

I claim:

1. A method of extending and flavoring a soft serve product independently of any heating step, comprising the steps of,
   providing in liquid form a soft serve product selected from the group consisting of ice cream, ice milk and non-dairy ice cream, said soft serve product having a solids content of between 25% and 30%,
   providing a gelatin mix including sugar, gelatin and flavoring in quantities approximately proportional to 18 grams gelatin per 170 grams of mix, the non-gelatin portion of said mix being substantially sugar,
   stirring the gelatin mix into cold water in quantities approximately proportional to six ounces of mix to one gallon of water, thereby producing a gelatin extender, and
   adding said gelatin extender to a liquid soft serve product in quantities approximately proportional to one gallon of gelatin extender to between three and four gallons of said soft serve product, thereby producing an extended and flavored soft serve product.

2. The method of claim 1 further comprising pouring said extended and flavored soft serve product into a soft serve product mixing and dispensing machine and mixing said extended and flavored soft serve product in said machine.

3. The method of claim 1 wherein said gelatin mix makes up between 0.7 and 0.9 percent by weight of said extended and flavored soft serve product.

4. The method of claim 1 wherein the temperature of the water, when the gelatin mix is stirred therein, is less than approximately 100° F.

5. The method of claim 4 further comprising drawing cold tap water into a container, and said stirring step comprises stirring said gelatin mix into said cold tap water in said container.

6. The method of claim 1 wherein said soft serve product comprises a product selected from the group consisting of ice cream, ice milk and non-dairy ice cream.

7. The method of claim 6 wherein said soft serve product comprises ice cream and the amount thereof is proportional to approximately four gallons in the combination of claim 1.

8. The method of claim 6 wherein said soft serve product comprises ice milk and the amount thereof is proportional to approximately four gallons in the combination of claim 1.

9. The method of claim 6 wherein said soft serve product comprises non-dairy ice cream and the amount thereof is proportional to approximately three gallons in the combination of claim 1.

10. The method of claim 1 wherein said gelatin mix generally has the consistency of granulated sugar.

11. A method of extending and flavoring the product produced from a powdered ice cream mix independently of any heating step, comprising the steps of
    providing a powdered ice cream mix adapted for mixing with a prescribed quantity of water,
    mixing said powdered ice cream mix with said prescribed quantity of water to produce a liquid ice cream,
    providing a gelatin mix including sugar, gelatin, and flavoring in quantities approximately proportional to 18 grams gelatin per 170 grams of mix, the non-gelatin portion of said mix being substantially sugar,
    stirring the gelatin mix into cold water in quantities approximately proportional to six ounces of mix to one gallon of water, thereby producing a gelatin extender, and
    adding said gelatin extender to said liquid ice cream in quantities approximately proportional to one gallon of gelatin extender to between three and four gallons of liquid ice cream, thereby producing an extended and flavored ice cream product.

* * * * *